Sept. 22, 1936. A. SCHORNO Re. 20,118

ICE CREAM ROLL CAKE

Original Filed Nov. 14, 1931

INVENTOR
Albert Schorno
BY Raphael O'Earl
ATTORNEYS

Reissued Sept. 22, 1936 Re. 20,118

UNITED STATES PATENT OFFICE 20,118

ICE CREAM ROLL CAKE

Albert Schorno, Detroit, Mich., assignor, by mesne assignments, to Newly Weds Baking Co., a corporation of Illinois Original No. 1,905,756, dated April 25, 1933, Serial No. 574,941, November 14, 1931. Application for reissue February 4, 1935, Serial No. 4,998

2 Claims. (Cl. 99—137)

The objects of the invention are:

First, to provide and produce an ice cream roll cake in which the cake and cream are well maintained in separate layers in the roll without the disintegration of the cake.

Second, to provide an improved cake material for such a roll.

Third, to provide an improved method of manufacturing and preparing the same.

Further objects pertaining to details and economies will appear from the description to follow.

A preferred form of my invention is illustrated in the accompanying drawing, in which.

I show as my invention a product very like a jelly roll except that, in place of jelly, ice cream is substituted and frozen in place. The cake 1 is made in a regular baker's sheet pan in the same way that the cake jelly roll is baked. The recipe for this cake is entirely different from that for jelly roll and is special. I use the following ingredients for a small batch:

3 lbs. granulated sugar,
1 lb. Crisco or other similar shortening material,
3 lbs. pastry or cake flour, so called,
11 whole eggs,
1½ quarts milk,
1 ounce of baking soda, and
4 ounces melted chocolate or other flavoring material. Chocolate is preferred because of its adding to the texture.

I mix the sugar and Crisco together and beat until very smooth. I then add the eggs and further beat until the same are completely incorporated. I then add the chocolate, or substitute other flavoring where that is required. Chocolate is usually flavored with vanilla. I then further beat in this flavoring material. I then mix the soda and milk together and beat that in and then finally add the flour and beat the entire mixture for a period of five minutes, preferably in a power-driven cake mixing machine.

The mix is then spread in a baker's sheet pan which is covered bottom and all sides with good firm wrapping paper. The cake is then baked, preferably in an electric oven with the damper closed at a temperature of 300 degrees Fahrenheit for about ten minutes. This retains the steam and prevents crust or glazing. This baking can be done in any oven by properly regulating the dampers and retaining steam to prevent the formation of a hard crust, so that the cake comes out as a tough, flavorous, broad, thin sheet. The cake thus made has a very substantial texture. It does not have a distinct separate crust and yet it is of such character that it resists the penetration of the ice cream even if the same melts to a considerable extent in the process of manufacture.

Figure 1:
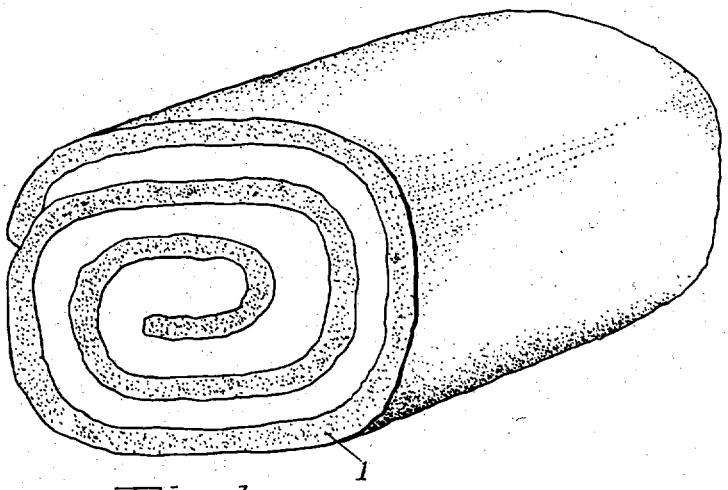
Fig. 1 is a perspective view of an ice cream roll cake made in accordance with my invention.
Figure 2:
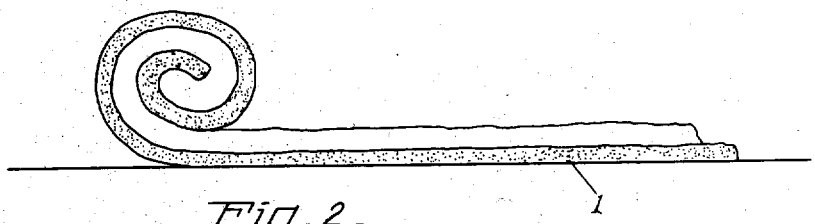
Fig. 2 is a detail showing the method of manufacturing and rolling the same.

A layer of ice cream is pread on the cake layer after it has become cooled. The wrapping paper is then manipulated, and made use of as a support for the cake which is molded and rolled into the same form as a jelly roll, as indicated in Fig. 1 of the drawing. The final end of the sheet is closed down tightly in position, enclosing and retaining the ice cream layer between. The material is then frozen stiff, when the cake can be sliced off the end of the roll the same as jelly roll and is a highly satisfactory dessert. It is also in very good condition for service at soda fountains and in cafes or wherever ice cream is ordinarily dispensed. The separate slices may be coated and wrapped in water proof paper, making a very effective package for quick distribution. This, of course, is not required in restaurants and soda fountain service.

The recipe for the cake, it will be noted, differs from a recipe for the cake for jelly roll in that it contains a large proportion of shortening material and that baking soda is made use of rather than baking powder, as it does not aerate the material to an undue extent. The chocolate is added, giving a very satisfactory flavor without interfering with the texture of the cake. Where other flavoring is used, the benefit of this effect, of course, is not secured.

I desire to claim this invention in its specific form and also broadly and to claim the process of manufacture.

Having thus described my invention, what I claim as new and desire to secure by Letters Patent is:

1. The method of manufacturing an ice cream cake roll consisting of forming a layer of cake dough containing approximately 10% of shortening to render substantially resistant to moisture on a sheet of paper, baking said dough at a temperature of approximately 300° F. and in the presence of steam to prevent forming a crust, cooling, applying thereto a layer of ice cream, convolutely wrapping the cake layer and the ice cream layer into a roll by the manipulation of the paper sheet, and freezing.

2. The method of manufacturing an ice cream roll cake which comprises forming a relatively thin layer of cake dough containing a relatively large amount of shortening to render the baked cake substantially resistant to moisture, baking said dough in the presence of steam to prevent forming a crust, allowing the cake to cool, applying a layer of ice cream thereto, and convolutely wrapping the cake and ice cream layer into the form of a roll, whereby to produce a structure wherein the ice cream and cake layers are readily separable from each other.

ALBERT SCHORNO.